Sept. 25, 1945.  E. THORESEN  2,385,388
BEARING SEAL
Filed Jan. 23, 1943
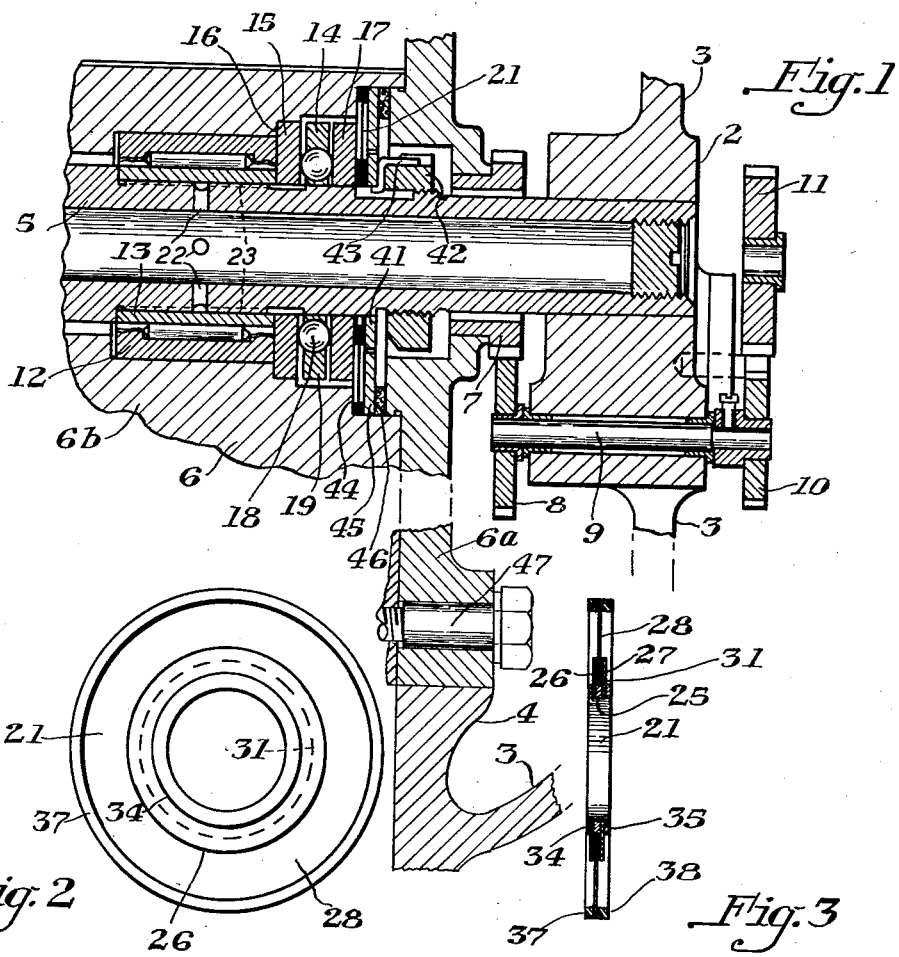
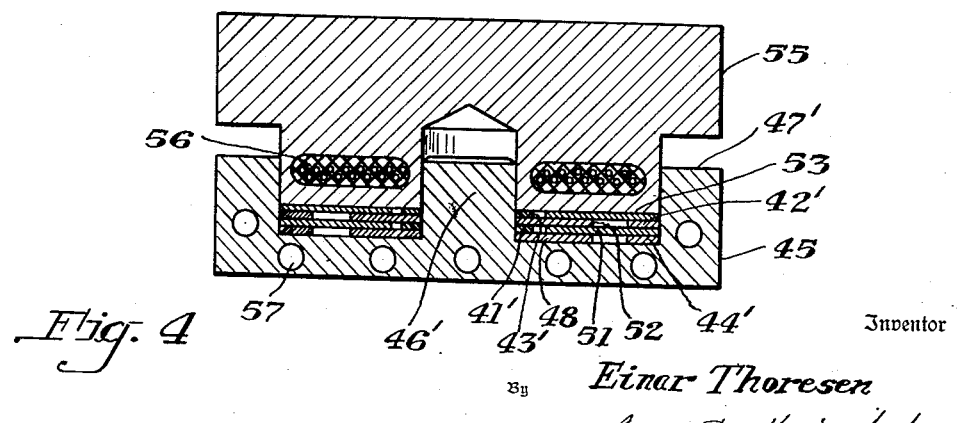
Inventor
Einar Thoresen
By Lewis D. Konigsford
Attorney Patented Sept. 25, 1945

2,385,388

UNITED STATES PATENT OFFICE 2,385,388

BEARING SEAL

Einar Thoresen, Pittsburgh, Pa., assignor to Pittsburgh Equitable Meter Company, Pittsburgh, Pa., a corporation of Pennsylvania Application January 23, 1943, Serial No. 473,289

4 Claims. (Cl. 288—3)

The present invention relates to sealing members particularly applicable to the sealing of roller bearings, ball bearings and the like.

It is an object of the present invention to provide a bearing seal which will substantially reduce friction.

Another object is the provision of a sealing device which will adjust itself for wear or relative movement between the members which are sealed thereby.

Another object is the provision of a sealing member which is of simple design, relatively inexpensive and is easy to manufacture.

According to the present invention I provide a sealing device comprising spaced stator members having located between them a rotor member and having a running clearance between the rotor member and the stator members, at least on one side so as to reduce or eliminate friction. This clearance is on the order of about one thousandth of an inch so as to substantially reduce leakage therethrough. The stator member may be secured to a relatively fixed shaft while the rotor member is secured to a moving rotor, or vice versa, so that there is relative rotary movement between the rotor and stator members. When installed as a seal for a ball bearing, or the like, any endwise movement of one of the stator or rotor members may result in rubbing contact on one surface, and by making the stator and rotary members flexible, such rubbing contact will not result in breakage thereof, nor in excessive wear of the rotor and stator parts.

The invention will be described in greater detail in connection with the accompanying drawing wherein is disclosed a preferred modification of the invention by way of example, and wherein:

Figure 1 is a diametrical section through a meter showing a preferred installation of the sealing device.

Figure 2 is a side view of a preferred embodiment of a sealing device,

Figure 3 is an end view of Figure 2, and

Figure 4 is a diametrical section of a modification, and shows an apparatus for manufacturing the same.

Referring to Figure 1 of the drawing, there is shown in diametrical section a portion of a rotary meter operating on the principle of that disclosed in Patent 2,274,206, issued February 24, 1942, to Walter H. Marsh. A central hub 2 supported by arms 3 extending from the top plate 4 supports a hollow shaft 5 upon which is rotatably mounted a rotor member 6 shown as made up of a top plate 6a and a body 6b. The top plate 6a carries a gear 7 which rotates therewith and meshes with a gear 8 held on one end of shaft 9 journalled in the hub 2 which carries a gear 10 at its other end meshing with a gear 11 on a shaft (not shown) adapted to drive the register mechanism. The rotor is journalled on the shaft 5 by means of lateral thrust roller bearings 12, the inner race 13 of which may be pressed onto the shaft, and is supported for end thrust by an end thrust ball bearing member indicated generally by the numeral 14. As shown one end thrust bearing plate 15 is pressed into a central recess 16 in the rotor body 6b and the other plate 17 is pressed onto the shaft 5, the balls 18 and spacer member 19 being located therebetween. The bearings 12 and 14 are lubricated under pressure through hollow shaft 5 having radial holes 22 and slots or grooves 23 therein.

The sealing member 21, to which the present invention particularly relates, is shown in detail in Figures 2 and 3. It comprises a middle spacing ring 25 of suitable thickness having integrally secured thereto on either side thin flexible annular stator plates 26 and 27. A rotor ring 28 of thin flexible sheet material is located between the two stator plates 26 and 27 and has a hole 31 of lesser diameter than the outside diameter of plates 26 or 27 and of greater diameter than the outside diameter of spacer 25 and is of slightly less thickness than spacer member 25, so as to provide a running clearance with the stator plates 26 and 27. For example, the spacer member 25 may have a thickness of 0.004 inch and ring member 28 may have a thickness of 0.003 inch, thus providing a clearance space of one thousandth of an inch on one side and rubbing contact on the other, or if the ring member 28 is centrally located between the plates the clearance will be one half thousandth of an inch on each side. Reinforcing or filler rings 34 and 35 are secured on the outer surfaces at the inner peripheries of plates 26 and 27, and on either face of the ring member 28 at its outer periphery are secured filler rings 37 and 38 preferably of such thickness that the overall thickness of the seal member at its outer periphery is substantially equal to its thickness at the inner periphery. Although I refer to members 26 and 27 as stator plates, and member 28 as the rotor plate, it will be understood this is merely to facilitate description, as member 28 may be the stator plate and members 26 and 27 the rotor plates, depending how the sealing member is installed in service.

Referring to Figure 1, it will be seen that the sealing member 21 has its inner periphery clamped against bearing plate 17 on the shaft 5 by a washer 41 and slotted nut 42 threaded on the shaft, and locked by indentated lock washer 43 while the outer periphery is clamped against a shoulder 44 on the rotor body 6b by a washer 45, gasket 46 and the top plate 6a held thereon by stud bolts 47 so that the ring 28 rotates with the rotor 6.

By making the stator and rotor members 26, 27 and 28 of flexible material, excessive wear in case of rubbing contact between these members and breakage due to misalignment in operation is eliminated. Should the end ball thrust bearing wear so as to cause misalignment of members 26, 27 and 28, they may become bowed or dished and come into rubbing contact without causing breakage or excessive wear. In practice a seal member of this type has been found to retard leakage of lubricant many times more effectively than the usual ball bearing felt sealing member in common use, and it is effective in excluding gritty materials from the bearings.

Sealing member 21 thus has its inner and outer peripheries clamped in sealing relation to shaft 5 and rotor 6, respectively, so that member 28 and attached rims 37 and 38 rotate with rotor 6 and relative to spacer ring 25, plates 26, 27 and rims 34 and 35 which are stationary with shaft 5. The lateral flexibility of annular sheet metal member 28 permits some degree of relative displacement of shaft 5 and rotor 6, or the bearing elements thereon, in the direction of the axis of shaft 5 without destroying the sealing properties of sealing member 21. The radial play between ring 25 and member 28 permits some degree of relative radial displacement between shaft 5 and rotor 6 without destroying the sealing properties of sealing member 21.

In Figure 4 there is shown a sealing member having a plurality of central webs or rotor plates and stator plates and a preferred method of manufacture applicable also to making the modification shown in Figures 2 and 3. The interior spacing rings 41' and 42' preferably are punched from thin sheet copper which has been tinned on both sides and then covered on both sides with a solder flux. The exterior rings 43' and 44' are punched from sheet copper tinned on one side (the inner side in the assembly), and covered with solder flux, although it may be more convenient to tin both sides. The fixture 45' preferably made of aluminum has a centering boss 46' and a confining flange 47' of the proper size and the sealing unit is assembled in the fixture as follows: A rotor plate 48 of thin sheet copper is laid on the bottom surrounding the central boss and the exterior spacing ring 44' of thin sheet copper tinned on the upper side is placed on the bottom within flange 47'. The spacer member 41' tinned on both sides is then placed on plate 48 and the stator plate 51 is placed on spacer 44', it being understood that spacer 41' has a slightly greater thickness than stator plate 51. Thus, if rings 41' and 44' are punched from a sheet having a thickness of our thousandths of an inch (.004) and rings 48 and 51 are punched from a sheet having a thickness of three thousandths of an inch (.003) the thickness of the assembly at its inner and outer peripheries will be the same, namely, seven thousandths of an inch (.007). Another rotor plate 52, three thousandth of an inch (.003) thick, is placed on ring 41' and spacer ring 42' tinned on both sides and four thousandths of an inch thick (.004) is placed on stator plate 51. Another stator plate 53 three thousandths of an inch (.003) thick is placed on spacer 42' and the exterior spacer 43' tinned on the lower side and four thousandths of an inch (.004) thick is placed on rotor plate 52, so that the assembly is fourteen thousandths (.014) inch thick at its inner and outer peripheries, but there is one thousandth inch clearance between stator plate 51 and rotor plates 48, 52, and one thousandth inch clearance between rotor plate 52 and stator plates 51, 53.

A ram 55 also of aluminum is brought down against the rings to hold them compressed. The rings are heated, for example, by means of electrical resistance elements 56 embedded in the ram to cause the solder coated surfaces to fuse and bond against the surface of the adjacent ring, the pressure serving to hold the rings flat and in intimate contact and to force out excess solder. The heating is then discontinued and cooling fluid is circulated through tubes 57 to cool the assembly below the fusion point of the solder, and thereafter the pressure is released by removal of the ram and the assembly is removed from the fixture. By making the fixture of aluminum it is insured that the tin will not adhere thereto, and thus the seal assembly can readily be removed. I prefer to employ a coating of tin about .0005 in. thick as the solder, which may be applied as an electrolytic coating to thus obtain a coating of uniform thickness without substantial excess solder. The ring 41' being coated on both sides will bond to plates 48 and 52 and spacer ring 43' will bond to plate 52, and ring 42' being coated on both sides will bond to plates 51 and 53 and spacer ring 44' will bond to plate 51. Even if the exterior faces of the rings are coated with solder they will not bond to the fixture which is made of aluminum.

In applying this method of manufacture to the modification shown in Figures 2 and 3, the spacer ring 25 and exterior spacer rings 34, 35, 37 and 38 would be coated on both sides. If ring 25 were .004 in. thick and rings 26, 27 were each .003 in. thick, and rings 34, 35 were .004 in. thick, thus making an overall thickness of .018 in., the outer rings 37 and 38 would be .0075 in. thick to make the outer thickness the same.

Various modifications may be made in the invention without departing from the spirit or scope thereof.

What I claim and desire to secure by Letters Patent is:

1. A laterally flexible annular bearing seal comprising an inner annulus having spaced radially extending thin flexible metallic flanges providing an outwardly open channel; a laterally flexible thin metallic apertured disk having its inner periphery disposed in said channel, the aperture in said disk being substantially larger in diameter than the diameter of the bottom of said channel; the width of said channel being greater than the thickness of said disk by an amount just sufficient to provide a running clearance while maintaining a seal between said disk and said flexible flanges, and the diameter of said disk being larger than the diameter of said annulus by a substantial amount sufficient to provide an appreciable laterally flexible annular region in said disk to permit axial displacement of said annulus relative to the periphery of said disk without creating excessive shear forces in said disk or said flanges or excessive friction therebetween.

2. A bearing seal as defined in claim 1 wherein said inner annulus has at its inner edge and said disk has at its periphery annular rings the outer surfaces of which lie in parallel planes disposed one at each side of said seal.

3. A fluid seal for incorporation between two relatively rotatable concentric machine parts comprising an outer annular member of thin flexible metallic material having a central aperture, and an inner annular member having a central aperture surrounded by a pair of parallel annular plates of thin flexible metallic material disposed one at each side of said outer annular member, and a spacer portion between said plates at their inner edges having a thickness greater than the thickness of said outer member by an amount sufficient to provide a running clearance between said outer member and said plates and a maximum diameter less than the diameter of the aperture in said outer member by an amount at least sufficient to accommodate the runout of said relatively rotatable machine parts, the diameter of said outer member being larger than the diameter of said inner member by a substantial amount sufficient to provide an appreciable laterally flexible annular region in said outer member to permit lateral displacement of said inner member relative to the periphery of said outer member without creating excessive shear forces in said members or excessive friction therebetween.

4. A bearing seal comprising two relatively rotatable annular members one comprising an apertured plate of thin resilient metallic material having a narrow thickening structure at one edge thereof and the other comprising a pair of similar apertured plates of thin resilient metallic material disposed one at each side of said first mentioned plate clear of said thickening structure, means separating said pair of plates to provide between them an annular space for the reception of said first mentioned plate, said means having a thickness greater than the thickness of said first mentioned plate by an amount sufficient to provide a slight running clearance and having a radial extent sufficiently smaller than the aperture in said first plate for providing a limited freedom of movement in radial direction between the two members comprising said seal, and a narrow thickening structure on said pair of plates at the edge thereof remote from the thickening structure on said first mentioned plate.

EINAR THORESEN.